US012133124B2

(12) United States Patent
Skarin et al.

(10) Patent No.: US 12,133,124 B2
(45) Date of Patent: Oct. 29, 2024

(54) MIGRATION OF COMPUTING INFORMATION BETWEEN EDGE COMPUTING DEVICES

(71) Applicant: Telefonaktiebolaget LM Ericsson (publ), Stockholm (SE)

(72) Inventors: Per Skarin, Lund (SE); Johan Eker, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 243 days.

(21) Appl. No.: 17/431,765

(22) PCT Filed: Feb. 26, 2019

(86) PCT No.: PCT/EP2019/054734
§ 371 (c)(1),
(2) Date: Aug. 18, 2021

(87) PCT Pub. No.: WO2020/173552
PCT Pub. Date: Sep. 3, 2020

(65) Prior Publication Data
US 2022/0124570 A1 Apr. 21, 2022

(51) Int. Cl.
*H04W 36/00* (2009.01)
*H04W 36/30* (2009.01)
(52) U.S. Cl.
CPC ....... *H04W 36/0072* (2013.01); *H04W 36/30* (2013.01)
(58) Field of Classification Search
CPC .......................... H04W 36/30; H04W 36/0072
(Continued)

(56) References Cited

U.S. PATENT DOCUMENTS

2013/0143578 A1  6/2013  Lekutai
2016/0277899 A1*  9/2016  Persson ............... H04W 64/006
(Continued)

FOREIGN PATENT DOCUMENTS

WO  2011137399 A1  11/2011
WO  2017128702 A1  8/2017
WO  2018171941 A1  9/2018

OTHER PUBLICATIONS

Quang, B., et al., "A Survey on Handoffs—Lessons for 60 GHz Based Wireless Systems", IEEE Communications Surveys and Tutorials, Institute of Electrical and Electronics Engineers, Jan. 1, 2012, pp. 1-23, vol. 14, No. 1, XP011420409.
(Continued)

*Primary Examiner* — Joel Ajayi
(74) *Attorney, Agent, or Firm* — Coats and Bennett, PLLC (57) ABSTRACT

A method for enabling migration of computing information between a first edge computing device associated with a first cell in a cellular network and at least a second edge computing device associated with a second cell in the cellular network, wherein the cellular network comprises a plurality of cells, the method comprising determining the trajectory of a wireless communication device located within a first cell of the cellular network, identifying a second cell of the cellular network towards which the trajectory leads, causing allocation of resources at the second edge computing device associated with the second cell to enable migration of computing information from the first edge computing device associated with the first cell to the second edge computing device associated with the second cell.

11 Claims, 6 Drawing Sheets

(58) Field of Classification Search
USPC .......................................................... 455/436
See application file for complete search history.

(56) References Cited

U.S. PATENT DOCUMENTS

2017/0064029 A1* 3/2017 Das ..................... H04L 67/568
2019/0158606 A1* 5/2019 Guim Bernat ........ H04W 40/20

OTHER PUBLICATIONS

Skarin, P. et al., "Towards Mission-Critical Control at the Edge and Over 5G", 2018 IEEE International Conference on EDGE Computing (EDGE), Jul. 2, 2018, pp. 50-57, [Retrieved on Sep. 26, 2018], IEEE.

Anonymous, "MIMO", Feb. 21, 2019, pp. 1-14, retrieved: URL:https://en.wikipedia.org/w/index.php?title- MIMO&oldid=884414106 [retrieved on Jul. 28, 2023], WikipediA.

Bao, J., et a., "Handover Prediction based on Geometry Method in mmWave Communications—A Sensing Approach", 2018 IEEE International Conference on Communications Workshops (ICC Workshops), May 20-24, 2018, 6 Pages.

Zhang, H., et al., "Mobility Prediction: A Survey on State-of-the-Art Schemes and Future Applications", IEEE Access, vol. 7, Jan. 4, 2019, 21 Pages.

Kuruvatti, N., et al., "Exploiting Mobility Context Awareness in Cellular Networks for Assisting Vehicular Use Cases", 2018 IEEE 88th Vehicular Technology Conference (VTC-Fall), Aug. 27-30, 2018, 7 Pages.

* cited by examiner

MIGRATION OF COMPUTING INFORMATION BETWEEN EDGE COMPUTING DEVICES

TECHNICAL FIELD

The present disclosure generally relates to edge computing related to user equipment connected via a telecommunications network. In particular, the various embodiments described in this disclosure relate to apparatuses, devices and methods for enabling migration of computing information between edge computing devices, initiated or caused by functionality in a cellular network.

BACKGROUND

This section is intended to provide a background to the various embodiments of the invention that are described in this disclosure. Therefore, unless otherwise indicated herein, what is described in this section should not be interpreted to be prior art by its mere inclusion in this section.

Telecommunications networks such as wireless cellular networks are built to handle user equipment (UE), for example mobile telephones, which may continuously be relocating. The coverage of a cellular network is divided in cells covering parts of the network's geographical area. Each cell can be seen as covered by a base station or access point (from now on referred to as base station). As UEs move about, they will leave the operating range of one cell, and enter into a new cell, which requires a cell-reselection (if in idle mode) or a handover procedure (if transferring an ongoing voice or data session). For the sake of simplicity, both of these procedures will be referred to as handover in the remainder of this document. A handover is a well-established procedure for cellular networks.

When a UE has an ongoing data session, it can typically communicate with one or more other UEs or with one or more servers. Traditionally, a UE communicated with dedicated servers. Examples could be a specific application running on a UE that communicated with a specific dedicated server, or a more generic application in a UE, like for example a web browser communicating with various servers. In modern implementations, computing is typically implemented by one or more shared pools of configurable computer system resources and higher-level services that can be rapidly provisioned with minimal management effort, often over the Internet. This is called cloud computing, and allows for server functionality to be accessed at servers owned and operated by different entities, rather than the traditional approach of hosting functionality only at a company's own servers. Cloud computing relies on sharing of computing power to achieve coherence and economies of scale. The cloud computer system resources and services are normally made available to server applications or parts of server applications for third party companies. Cloud computing can be seen as a utilizing centralized computing power, where the UE is not normally aware of the physical location of the server functionality.

A development of cloud computing is what is known as "distributed computing". To achieve this, a modern data communication network or scenario may be divided into a UE, where local operations may be performed, a "cloud", where centralized operations may be performed, and an "edge", between the cloud and the UE, where, for example, more time critical operations may be performed. As such, these networks are often referred to as distributed networks, as the computing demands on the network may be distributed and shared between different layers. Computing may be performed in any combinations of: in the UE, in the cloud, at the edge, and at computing infrastructures that are between the cloud and the edge (this is sometimes referred to as the "fog"). Various concepts and terminology are used in this area, for example edge computing, fog computing and cloud computing. This setup allows UE interaction with server functionality, and in some applications even UE to UE interaction, with low latency by bypassing the centralized cloud, and thus provides improved performance for timing critical applications and supports a new class of applications to operate in a cloud setting.

Developments to the design and standardization of newer telecommunications networks continuously provide higher data bandwidths and lower latency. This has made it possible to design and plan for applications that have increasingly higher data communication requirements, for example streaming of movies in traditional UEs (mobile phones, tablets, etc.), but also for various internet of things (IoT) applications such as sensors, actuators, automotive applications, augmented reality etc. Some of these applications put high demands on bandwidth and latency not only on the connection to the telecommunications networks (the link between the UE and the base station) but also on the entire data communication path to the server. One step to meeting these requirements has been to place the server applications, or parts of them, on computing devices that are closer to the base stations. Specifically this applies to functionality that has high real time requirements and needs. This is the background for edge computing.

Edge computing is a distributed computing paradigm in which computation is largely or completely performed on distributed edge computing resources known as smart devices or edge devices, as opposed to primarily taking place in a centralized cloud environment. The eponymous "edge" refers to the geographic distribution of edge computing devices in a network. Typically edge computing refers to the case when a part of, or all of, a server application executes very close to a base station, or sometimes even in computing devices inside a base station. The motivation is to provide server resources, data analysis and artificial intelligence ("ambient intelligence") closer to data collection sources and cyber-physical systems such as smart sensors and actuators, but also to other types of UE. Edge computing is seen as important in the realization of physical computing, smart cities, ubiquitous computing, multimedia applications such as augmented reality and cloud gaming, and IoT. Edge computing will for example provide lower delay and latency.

Traditionally one has regarded the telecommunications network (the cellular network) as one network, providing traditional telecommunications services as voice and SMS, but also access to data services for example in servers in internet via gateways. With this mind-set, the internet has often been regarded as a second separate data communications network. With the introduction of edge computing, the telecommunications network and the data communications network can be regarded as partly merging, or overlapping, especially when edge computing power is made available in base stations. One could also imagine a telecommunications network to provide not only edge computing power but also traditional cloud functionality, in this case one could even regard the two networks as one. The UE might be regarded as a separate entity or as part of any or both of the networks.

In future 5G scenarios, edge computing may be utilised to provide enhanced performance for applications in UEs connected via a cellular network. In an edge computing infrastructure, an application may be viewed as a set of connected components. The application is deployed across the distributed infrastructure. In cloud terminology the process of deciding how and where to place computation is referred to as orchestration. Application components can be placed in multiple ways in order to fulfil different timing requirements. When a UE moves from one cell to another in a cellular network, the application components executing in edge computing devices need to follow suit. We call this procedure migration of application components. This migration is handled by a cloud orchestrator. The orchestrator orchestrates deployments by considering compute devices in the edge network and data centres and the constraints imposed by the application in terms of latency requirements etc. This could cause the orchestrator to redeploy applications (move computing resources, meaning any combinations of software, data, state machines and variables, etc.) between different edge computing devices and to and from data centres. This reorganization may be triggered by an event informing the system of an in progress cellular handover.

Developing and deploying applications for such an infrastructure is challenging. Firstly, the application structure must be such that it lends itself to being executed on top of a distributed infrastructure. Secondly, the orchestrator must be able to dynamically move application components horizontally between the centralized datacentre and the edge computing devices, to optimize for latency, and vertically between different edge computing devices to always stay in proximity to the UE. At present, networks can provide a cloud orchestrator with handover events and a rough location based on channel measurements and a known cellular network topology. However, this information is tightly coupled to the layout, timings and operations of the network, and the positioning data is two dimensional, imprecise and/or suffering from terrain warping and occlusion. Additionally, there is a dependence on explicit communication with the UE. Furthermore, re-orchestration can easily become very time consuming.

The present disclosure attempts to mitigate at least some of these issues and provide an improved way of orchestrating applications in a distributed network.

SUMMARY

It is in view of the above background and other considerations that the various embodiments of the present disclosure have been made.

During the migration process running code will be moved, or rather, stopped and reactivated. This will inevitably lead to some period of downtime, which we want to keep as short as possible. To this end, it is desirable to be able to predict the occurrence of migration events and plan for them. Location information, such as position, speed and direction is useful information to predict when a UE may request a hand-over from one cell to another. In view of the above, it is therefore a general object of the aspects and embodiments described throughout this disclosure to provide a system that uses the position and direction of UEs to predict upcoming migration actions and prepare for them such that latency is reduced.

One important advantage of the embodiments of the present disclosure is to be able to prepare for a seamless migration. A successful complete migration can conceptually be divided into different stages, as below. The stages are not necessarily performed in the same device.

Detecting that a handover might take place within a given period of time.

Detecting a target base station (the base station to which an expected handover will be performed).

Initiating resource allocation at an edge computing device associated with the target base station.

Migrating computing information from an edge computing device associated with the currently serving base station to the edge computing device associated with the target base station. The computing information can include static information such as application software, which may be migrated first, and data as well as dynamic information such as state machines and application variables, which may be migrated later.

Continuing (preferably for a limited time) the execution on the first edge computing device.

Performing the handover (making the target base station the new serving base station).

Migrating any final computing information, for example the dynamic information discussed above, allowing the execution to continue on the edge computing device associated with the target base station (which is the new serving base station).

A successful complete migration could be considered seamless if the performance of the application or application part executing in the UE has not been interrupted beyond acceptable standards. This general object has been addressed by the appended independent claims. Advantageous embodiments are defined in the appended dependent claims.

According to a first aspect, there is provided a method for enabling migration of computing information between a first edge computing device associated with a first cell in a cellular network and at least a second edge computing device associated with a second cell in the cellular network, wherein the cellular network comprises a plurality of cells, the method comprising determining the trajectory of a wireless communication device located within a first cell of the cellular network, identifying a second cell of the cellular network towards which the trajectory leads, causing allocation of resources at the second edge computing device associated with the second cell to enable migration of computing information from the first edge computing device associated with the first cell to the second edge computing device associated with the second cell.

Optionally, the method comprises determining the trajectory of the wireless communication device based on determining a beam/signal strength of the wireless communication device relative to at least one access node of the network. Optionally, the method comprises determining the trajectory of the wireless communication device based on positioning information from a massive MIMO antenna.

Optionally, the method further comprises causing allocation of resources at at least one third edge computing device associated with at least one third cell to enable migration of computing information from the first edge computing device associated with the first cell to the at least one third edge computing device associated with the at least one third cell. Optionally, the allocation of resources comprises configuring at least one of compute capacity, storage capacity, connectivity, and/or radio capacity of the respective edge computing device. Optionally, the method further comprises causing migration of computing information from the first edge computing device associated with the first cell to the edge computing devices at which resources have been allocated.

According to a second aspect, there is provided a computing device for enabling migration of computing information between a first edge computing device associated with a first cell in a cellular network and at least a second edge computing device associated with a second cell in the cellular network, wherein the cellular network comprises a plurality of cells, the device configured to determine the trajectory of a wireless communication device located within a first cell of the cellular network, identify a second cell of the cellular network towards which the trajectory leads, cause allocation of resources at the second edge computing device associated with the second cell to enable migration of computing information from the first edge computing device associated with the first cell to the second edge computing device associated with the second cell.

Optionally, the computing device is further configured to determine the trajectory of the wireless communication device based on a beam/signal strength of the wireless communication device relative to at least one access node of the network. Optionally, the computing device is further configured to determine the trajectory of the wireless communication device based on positioning information from a massive MIMO antenna.

Optionally, the computing device is further configured to cause allocation of resources at at least one third edge computing device associated with at least one third cell to enable migration of computing information from the first edge computing device associated with the first cell to at least one third edge computing device associated with at least one third cell. Optionally, the allocation of resources comprises configuring at least one of compute capacity, storage capacity, connectivity, and/or radio capacity of the respective edge computing device. Optionally, the computing device is further configured to cause migration of computing information from the first edge computing device associated with the first cell to the edge computing devices at which resources have been allocated.

According to a third aspect, there is provided a method for enabling migration of computing information between a first edge computing device associated with a first cell in a cellular network and at least a second edge computing device associated with a second cell in the cellular network, wherein the cellular network comprises a plurality of cells, the method comprising receiving a first orchestration alert indicating that a UE located in the first cell is moving towards the second cell, allocating resources at the second edge computing device associated with the second cell to enable migration of computing information from the first edge computing device associated with the first cell to the second edge computing device associated with the second cell.

According to a fourth aspect, there is provided a computing device for enabling migration of computing information between a first edge computing device associated with a first cell in a cellular network at least a second edge computing device associated with a second cell in the cellular network, wherein the cellular network comprises a plurality of cells, the device configured to receive a first orchestration alert indicating that a UE located in the first cell is moving towards the second cell, allocate resources at the second edge computing device associated with the second cell to enable migration of computing information from the first edge computing device associated with the first cell to the second edge computing device associated with the second cell.

According to a fifth aspect, there is provided a computer program, comprising instructions which, when executed on at least one processor, cause the at least one processor to carry out the method. Also disclosed is carrier containing the computer program, wherein the carrier is one of an electronic signal, optical signal, radio signal, or computer readable storage medium.

The various proposed embodiments herein may reduce latency in migration actions by predicting where and when they may occur and preparing for them accordingly. The proposed embodiments therefore allow for improved orchestration of edge computing. The proposed embodiments use information available at the base station and do not rely on sensors at the UEs nor additional communication with the UE for the purpose of positioning. As certain embodiments do not rely on positioning information in the UEs (such as GPS) they will also support low end, low cost, devices.

BRIEF DESCRIPTION OF THE DRAWINGS

These and other aspects, features and advantages will be apparent and elucidated from the following description of various embodiments, reference being made to the accompanying drawings, wherein.

Like reference numbers refer to like elements throughout the description.

DETAILED DESCRIPTION

The present invention will now be described more fully hereinafter. The present invention may, however, be embodied in many different forms and should not be construed as limited to the embodiments set forth herein; rather, these embodiments are provided by way of example so that this disclosure will be thorough and complete, and will fully convey the scope of the invention to those persons skilled in the relevant art.

Figure 1:
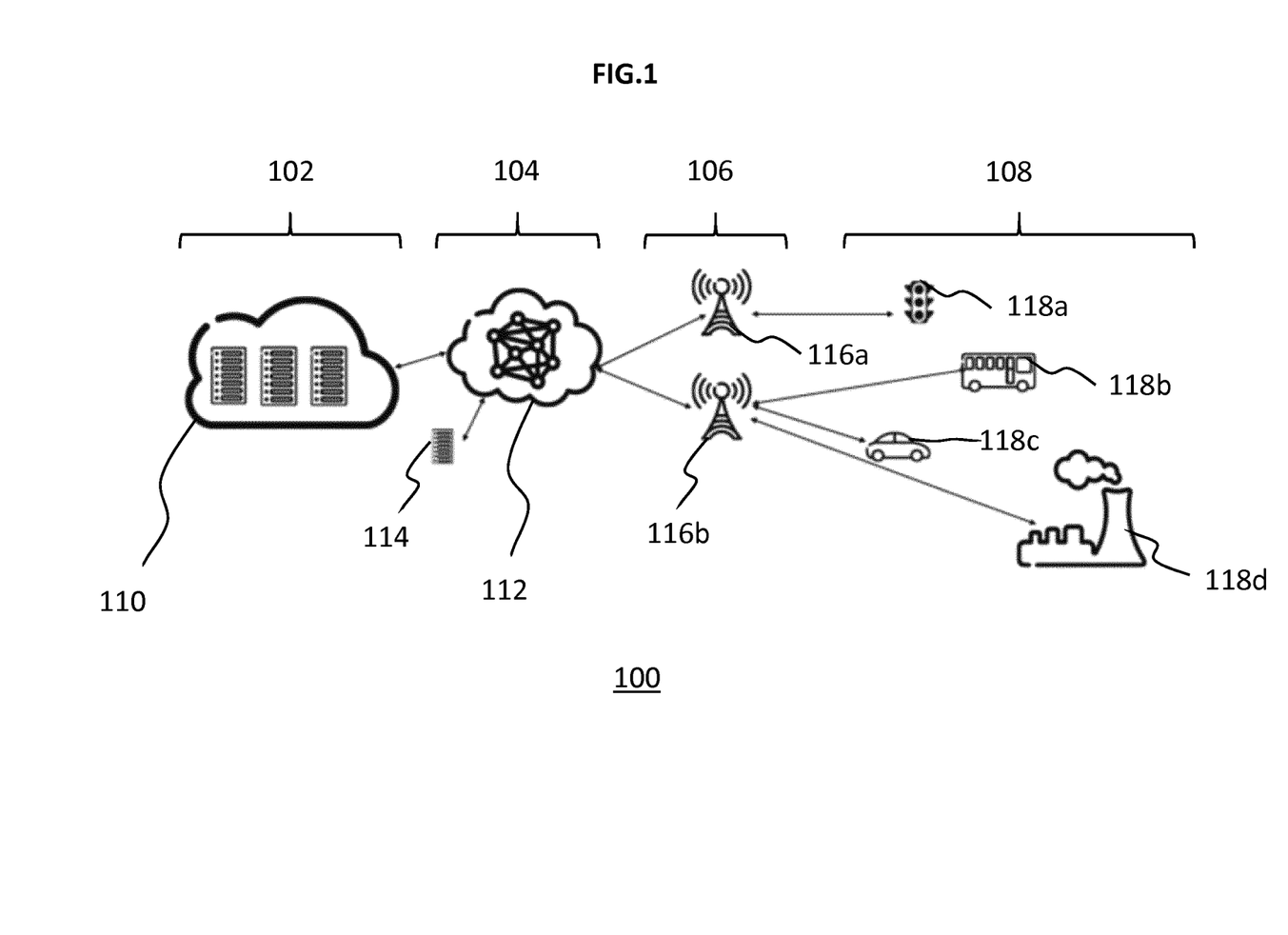
FIG. 1 shows a schematic view of a communication system according to the disclosure.

With reference to FIG. 1, a communication system 100 is shown. The communication system is a distributed system, such that parts of the system are implemented in a cloud 102, a fog 204, an edge 106 and a user equipment layer 108.

The cloud 102 comprises a host computer 110 implemented as a cloud-implemented server. In other embodiments, the host computer may be embodied in the hardware and/or software of a standalone server, a distributed server or as processing resources in a server farm. The host computer 110 may be under the ownership or control of a service provider, or may be operated by the service provider or on behalf of the service provider. The host computer 110 comprises hardware configured to set up and maintain a wired or wireless connection with an interface of a different communication device of the communication system 100. The host computer 110 may further comprise processing circuitry, which may have storage and/or processing capabilities. In particular, the processing circuitry may comprise one or more programmable processors, application-specific integrated circuits, field programmable gate arrays or combinations of these (not shown) adapted to execute instructions. The host computer 110 further comprises software, which is stored in or accessible by the host computer 110 and executable by the processing circuitry. The software includes a host application. The host application may be operable to provide a service to a remote user, for example a user connecting via an over the top (OTT) connection. In providing the service to the remote user, the host application may provide user data which is transmitted using the OTT connection.

The fog 104 may comprise a core network 112. The core network 112 may be a 3GPP-type cellular network. The fog 104 may also comprise a fog computer 114. Connections between the host computer 110 and the core network 112 may extend directly from the host computer 110 to the core network 112 and/or the fog computer 114, or may go via an optional intermediate network (not shown). The intermediate network may be one of, or a combination of more than one of, a public, private or hosted network; the intermediate network, if any, may be a backbone network or the Internet; in particular, the intermediate network may comprise two or more sub-networks (not shown). The fog computer 114 may be considered part of the core network 112, or separate from the core network 112 for example operated and handled by an entity different from the telecom network operator.

The edge 106 comprises a number of base stations 116a, 116b. Base stations may also be called access nodes. The base stations may be implemented in an access network, as described in relation to FIG. 2. The base stations 116 comprise hardware enabling them to communicate with the core network 112, and via the core network 112 with the host computer 110. The base stations 116 also comprise hardware enabling them to communicate with the user equipment (UE) 118 located in the user equipment layer 108. Each base station 116 is configured to set up and maintain a wired or wireless connection with an interface of a different communication device of the communication system 100, for example a UE 118 located in a coverage area (not shown in FIG. 1) served by the base station. Each base station 116 may also be configured to facilitate a connection to the host computer 110. The connection may be direct or it may pass through the core network 112 and/or through one or more intermediate networks outside the communication system. Each base station 116 may comprise one or more programmable processors, application-specific integrated circuits, field programmable gate arrays or combinations of these (not shown) adapted to execute instructions. Each base station 116 further has software stored internally or accessible via an external connection.

The user equipment layer 108 comprises a number of user equipment elements 118. In FIG. 1, a first UE 118a is wirelessly connectable to, or configured to be paged by, a corresponding base station 116a. A second UE 118b, third UE 118c and fourth UE 118d are wirelessly connectable to a corresponding base station 116b. While a plurality of UEs 118 are illustrated in this example, the disclosed embodiments are equally applicable to a situation where a sole UE is in the coverage area or where a sole UE 118 is connecting to a corresponding base station 116.

Each UE 118 may include a radio interface configured to set up and maintain a wireless connection with a base station 116 serving a coverage area in which the UE 118 is currently located. The hardware of the UE 118 further includes processing circuitry, which may comprise one or more programmable processors, application-specific integrated circuits, field programmable gate arrays or combinations of these (not shown) adapted to execute instructions. Each UE 118 further comprises software, which is stored in or accessible by the UE 118 and executable by the processing circuitry. The software may include a client application operable to provide a service to a human or non-human user via the UE 118, with the support of the host computer 110. In the host computer 110, an executing host application may communicate with the executing client application via the OTT connection, or via other connections, terminating at the UE 118 and the host computer 110. In providing the service to the user, the client application may exchange user data (also referred to as application data, or data) with the host application, also referred to as the server application. The OTT connection, or other connection, may transfer the user data. The client application may interact with the user to generate the user data that it provides. Example UEs 118 are mobile telephones, smartphones, tablets, laptops, and internet of things (IoT) devices such as connected sensors, meters etc. The UEs in the present context may be, for example, permanently or temporarily mounted on equipment (containers, etc.) or a fixed structure (wall, roof, etc.), portable, pocket-storable, hand-held, computer-comprised, wearable and/or vehicle-mounted mobile devices, just to mention a few examples. The UEs 118 are also commonly referred to as communication devices, wireless devices, wireless communication devices, wireless terminals, mobile terminals, mobile stations, user equipment (UE), mobile telephones, cellular telephones, etc. These terms can typically be regarded as synonyms, but some of them are also in some contexts used to denote a communication device in relation to a specific telecom standard, but the latter aspect is not of importance in the present context.

The communication system of FIG. 1 as a whole enables connectivity between one of the connected UEs 118 and the host computer 110. The host computer 110 and the connected UEs 118 are configured to communicate data using the access network, the core network 112, any intermediate network and possible further infrastructure (not shown) as intermediaries. In the case of an OTT connection, or other connection, the connection may be transparent in the sense that the participating communication devices through which the OTT connection, or other connection, passes are unaware of routing of uplink and downlink communications. For example, a base station 116 may not or need not be informed about the past routing of an incoming downlink communication with data originating from a host computer 110 to be forwarded (e.g., handed over) to a connected UE 118. Similarly, the base station 116 need not be aware of the future routing of an outgoing uplink communication originating from the UE 118 towards the host computer 110.

Figure 2:
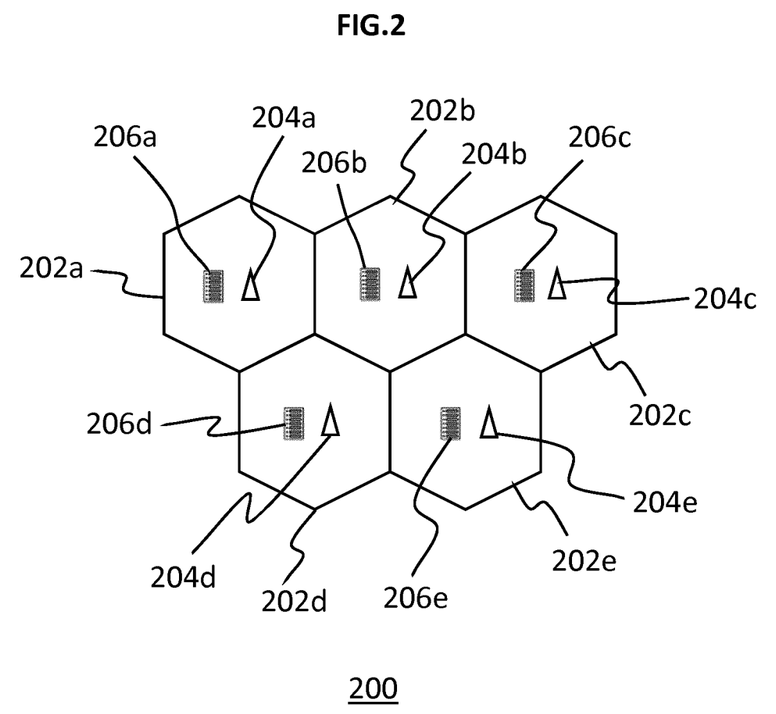
FIG. 2 shows a schematic view of an access network according to the disclosure.

With reference to FIG. 2, an access network 200, such as a radio access network, is shown. The access network 200 may be considered as implemented as part of the edge 106, or another way to describe it would be to say that the edge would be implemented in, or close to, the access network, shown in FIG. 1. The access network 200 comprises a plurality of cells 202a, 202b, 202c, 202d, 202e. The access network 200 also comprises a plurality of base stations 204a, 204b, 204c, 204d, 204e, such as NodeBs, eNodeBs, gNodeBs or other types of wireless access points. Each of the base stations 204 defines a corresponding coverage area, which in some embodiments may be aligned with the cells 202. Each base station 204 is connectable to the core network 112 over a wired or wireless connection. The access network 200 may also comprise a plurality of edge computing devices 206a, 206b, 206c, 206d, 206e comprising processing circuitry, which may have storage and/or processing capabilities. In particular, the processing circuitry may comprise one or more programmable processors, application-specific integrated circuits, field programmable gate arrays or combinations of these (not shown) adapted to execute instructions. Each edge computing device further comprises software, which is stored in or accessible by the edge computing device and executable by the processing circuitry. The edge computing devices may be comprised in respective base stations 204, or may be separate from the base stations 204. When being separate from the base stations they might still be considered part of the access network, or they might be considered separate from the access network. In some embodiments, each cell 202 may have a corresponding computing device 206. In other embodiments, one computing device may serve two or more base stations. In some embodiments, the computing devices 206 are geographically located within their corresponding cell 202, whereas in other embodiments, the computing devices 206 are geographically located outside their corresponding cell 202. These computing devices 206 may be seen as edge computing devices for performing edge computing.

Figure 3:
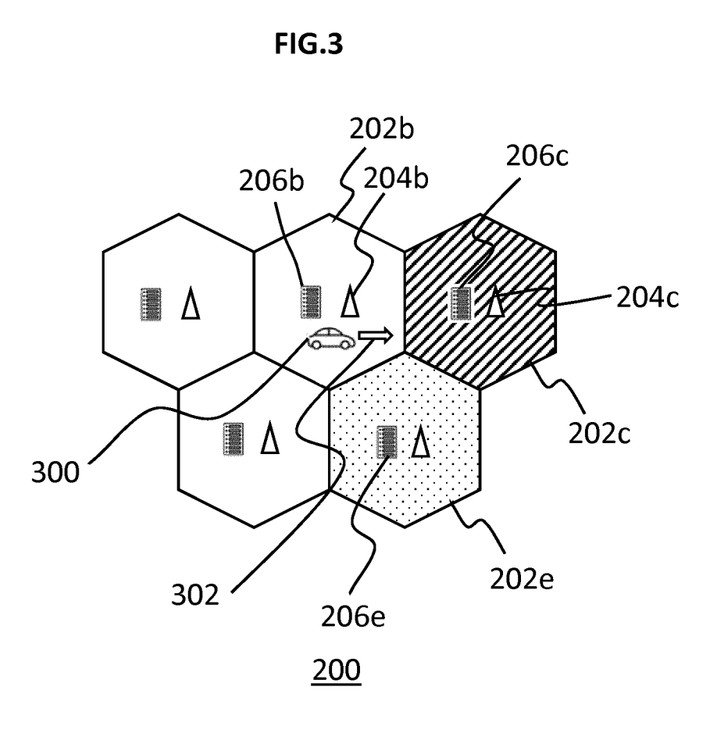
FIG. 3 shows the access network with a user equipment moving through it.

FIG. 3 shows the access network 200 with a UE 300 moving through it. The UE 300 may be one of the UEs 118 described in relation to FIG. 1. A UE such as UE 300 will typically connect operationally to different base stations when moving around geographically. In the example of FIG. 3, the UE 300 is currently within the area defined by a first cell 202b. The UE 300 may use an application having components that execute on the edge 106, and/or in the fog 104, and/or in the cloud 102. In some embodiments, the UE 300 is communicatively coupled to the corresponding base station 204b. The connection between the UE 300 and the base station 204b of the first cell 202b allows the UE 300 to be connected to the communications system 100 and therefore use its functionality. In other embodiments, the UE may be communicatively coupled to other base stations 204 in the access network 200. The coupling between the UE 300 and the base station 204 to which it is coupled is wireless. In some embodiments, the edge computing device 206b of the first cell 202b handles processing and memory requirements relating to components of applications used by the UE 300 that execute on the edge 106. In other embodiments, other edge computing devices 206 may additionally or alternatively be used to handle such computations.

The application running in the UE 300 can interact with an application running in another device, for example an application running in another UE or a server application running in a stationary computer or server. The server might be connected to the telecommunication network in a variety of ways, wirelessly or via a fixed wired connection. The server might be part of the telecommunications system 100, for example the host computer 110, and may be administrated by the same operator but could also reside outside the telecommunications system 100 and be operated by a different entity. The application on the UE 300 and the server application might be considered as different applications or parts of the same distributed application. The server application might run on an edge computing device for example in order to provide better performance like shorter roundtrip delay or higher throughput, etc. The application, or part of an application, that executes in the cloud or in an edge computing device is referred to as the server application.

The UE 300 may, at some later stage, move from the area defined by the first cell 202b into an area defined by another cell 202 in the access network 200. The new cell can be called a target cell. As explained above, there is more than one procedure for how to disconnect from a current serving base station and connect to a new base station. The term handover will be used to denote these procedures. There are also several ways to identify a potential new serving base station also referred to as a target base station.

In order to perform a successful migration that is perceived as seamless by the UE 300, as much of the computing information as possible should be migrated to the target edge computing device (for example, associated with the target base station) before the handover takes place. Any parts that cannot be migrated in advance can be migrated at the handover or just after the handover. As discussed above, the computing information may be made up of static and dynamic information. For example, the static information may comprise executable code, application software and static data which does not change over time, at least not frequently. The dynamic information may comprise state machines and application variables, which change over time, at least more frequently than the static data. In some embodiments, the static information, and the dynamic information may be migrated at different times. For example, the static information can be migrated at some time before the handover, whereas it may be beneficial to migrate the dynamic information as late as possible to ensure that it is as up to date as possible.

A trigger function, which is aware of the UEs movement in the cell and can construe a trajectory and predict when a UE will or could make a handover in advance, is implemented in the system 100. The trigger function may be implemented in a base station 116 or some other device in the communication system 100. Alternatively, it could be implemented in a device that is outside the telecommunications network. In some embodiments, the trajectory may be determined using geolocation techniques known in the art, for example the Global Positioning System (GPS). In other embodiments, the trajectory of the UE 300 is determined based on a beam/signal strength of the wireless communication device relative to at least one base station 204 in the access network 200, as will be discussed below.

In some embodiments, the trajectory of the UE 300 is determined based on positioning information from a massive multiple-input and multiple-output (Massive MIMO) antenna. In wireless radio communication, MIMO is a method for multiplying the capacity of a radio link using multiple transmit and receive antennae. MIMO allows multiple data signals to be transmitted and received simultaneously over the same radio channel, typically using a separate antenna for the transmitting and receiving of each signal. "Massive MIMO" is a MIMO system with an especially high number of antennae and, as such, the number of UEs is much less than the number of base station antennae. It is widely expected that Massive MIMO will be an important part of 5G standards and networks.

Antennae in the base stations 204 of the access network 200 are used to provide the antenna array of a Massive MIMO system. In a rich scattering environment, the full advantages of the Massive MIMO system can be exploited using simple beamforming strategies such as maximum ratio transmission (MRT), maximum ratio-combining (MRC) or zero forcing (ZF). Beamforming or spatial filtering is a signal processing technique used in sensor arrays for directional signal transmission or reception. This is achieved by combining elements in an antenna array in such a way that signals at particular angles experience constructive interference while others experience destructive interference. Beamforming can be used at both the transmitting and receiving ends in order to achieve spatial selectivity. The improvement compared with omnidirectional reception/transmission is known as the directivity of the array. To change the directionality of the array when transmitting, a beamformer controls at least the phase and relative amplitude of the signal at each transmitter, in order to create a pattern of constructive and destructive interference in the wavefront. When receiving, information from different sensors is combined in a way where the expected pattern of radiation is preferentially observed. Such a system enables positioning of UEs and this information is necessary in the modulation procedure in order to generate waveforms which optimize signal-to-noise ratios at the receivers.

During normal operation, the Massive MIMO antenna of the serving base station, in this case base station 204b, is in communication with all the UEs in the user equipment layer, including the UE 300. The Massive MIMO antenna keeps track of the positions of the UE 300 and frequently feeds this information to a processing device in the base station 204b. This information includes reliable elevation data, which allows three-dimensional location to take place. The positioning information from the Massive MIMO antenna is fed directly into a tracker in the base station 204b. The tracker can track movement and make local predictions as to the trajectory of the UE 300. In some embodiments the tracker translates the position information to world coordinates. This information is passed to the trigger function. In some embodiments the tracker and the trigger function are implemented as one function and/or in the same device.

Returning to FIG. 3, the UE 300 is moving in a direction indicated by arrow 302. The trigger function obtains information about the movement of the UE 300 and determines if the UE 300 is physically moving in such a way that a handover could take place within a certain time. Once the trajectory of the UE 300 has been determined, it is possible to identify one or more cells 202 towards which the trajectory leads. In the example of FIG. 3, the trajectory indicated by arrow 302 leads from the first cell 202b towards a second cell 202c, indicated by the hatched shading. It may therefore be predicted that the UE 300 will leave the operating range of the first cell 202b and enter into the second cell 202c. In some embodiments, neighbouring cells may also be identified so that the system is prepared for any changes in trajectory as the UE 300 moves. In other embodiments, a chain of cells may be identified in cases where the trajectory can be assumed over a longer distance, for example if the UE 300 is travelling along a road. In other cases, the trajectory may lead to more than one cell 202 in the access network 200. For example, the trajectory may lead to a boundary between cells 202. In such a case, all cells that meet at the boundary may be identified as possible destination cells.

When the UE 300 moves from cell 202b into a new cell 202c, a handover procedure will be required to continue service from the access network 200 to the UE 300. For the application in the UE to work efficiently with an application executing in an edge computing device, it will be necessary to migrate computing information from the edge computing device associated with the first cell 202b to the edge computing device in the new cell 202c. For example, in the case that the UE 300 will move from the first cell 202b to the second cell 202c, computing information present on the edge computing device 206b of the first cell 202b needs to be migrated to the edge computing device 206c of the second cell 202c such that the edge computing device 206c of the second cell 202c may handle processing and memory requirements of applications used by the UE 300 that execute in the edge 106.

To enable this migration, it is necessary that sufficient resources are available at the edge computing device 206c of the second cell 202c such that the migration can take place without any unnecessary delay. These resources may include, for example, radio link spectrum, transmit power, computing capacity, storage capacity, connectivity, and/or radio capacity. As such, the necessary resources are allocated at the edge computing device 206c of the second cell 202c. In some cases the resources might be available directly. In some other cases it might be necessary to remove information currently stored on the edge computing device 206c to increase available capacity of the computing resource 206c. For example, applications that are have a lower priority or are no longer necessary may be deleted from the computing resource 206c. The specific determination of which resources to move to and from which location can be modelled as a multidimensional optimization problem.

When the trigger function has determined that a UE will likely make a handover to another base station, the trigger function will cause the initiation of allocation of resources in another edge computing device and migration of a first computing information, typically static information. The causing of allocation of resources and migration of a first computing information can be done by sending a first orchestration alert to an orchestrator. The orchestrator is responsible for allocating resources in the device that the application will migrate to and the orchestrator is also responsible for the different migrations that might be needed.

The orchestrator could be implemented in different devices in different embodiments. For example, the orchestrator could be a centralized function, running for example in a server in the cloud, or on a dedicated server. The orchestrator may be implemented in an the edge computing device 206b, another edge computing device 206 in the access network 200, or another edge computing device located elsewhere in the communication system 100. For example, the orchestrator may be comprised in a base station 204 in the access network 200 or may be a dedicated edge computing resource 206 present somewhere within in another cell 202 of the access network 200. Alternatively, the orchestrator may be located in another part of the edge network 106, or in the fog 104 or the cloud 102. The orchestrator could run permanently in one of the edge computing devices. The orchestrator could also run in one of the edge computing devices, but be migrated together with the server application, meaning that when a successful migration is terminated, the orchestrator would run on the new edge computing device. The orchestrator has information about the applications, or parts of applications, that execute in the UE, and/or in the cloud and/or in the edge computing devices. In some embodiments the trigger function and the orchestrator could be implemented in the same device.

As the UE 300 is moving, a crossover between cells 202 of the access network 200 may be imminent, and so a migration action may be required. Since migration actions are typically slower than a voice/data hand-over, the system needs to prepare in advance. Therefore, the orchestrator will have to assess the capabilities (compute, storage, connectivity, radio capacity) of possible target devices and calculate a new desired state. The trigger function determines when to trigger the first orchestration alert, for example based on one or more thresholds. The first orchestration alert could in some embodiments be an external event (in the case that the trigger function and the orchestrator are implemented in the same device as a single module), but in other embodiments it could be a signal or message that is sent to an orchestrator (regardless of whether they are implemented in the same device or in separate devices).

The first orchestration alert comprises information that would be necessary for the orchestrator to identify at least one edge computing device where the allocation of resources would take place and to which the first migration likely would be done. This information could be one or more of; the ID or address of one or more base stations, the ID or address of one or more edge computing devices, geographical coordinates or geographical names or other information allowing the orchestrator to identify one or more edge computing devices for resource allocation and migration. In some case an orchestrator might determine that it is not beneficial, or even possible, to make resource allocations and migrate the first computing information. An example of this could be where a UE is about to make a handover to a new base station, but that the serving base station and the new base station actually use the same edge computing resource.

Once resources are allocated at the identified cells, migration of first computing information, typically static information, from the computing resource 206b of the first cell 202b to a computing resource associated with the identified cells can be performed. In the example of FIG. 3, first computing information is migrated to the computing resource 206c of the second cell 202c. In some cases, the first computing information is migrated as soon as sufficient resources are available in the identified cells. The computing information is moved and unused resources can be released. In some embodiments, where the server application continues to run on the first edge computing device, the resources are not released until the second (e.g., dynamic) computing information is migrated. The migration of first computing information to the identified cells is advantageously completed before the UE 300 leaves the first cell 202b.

Figure 4:
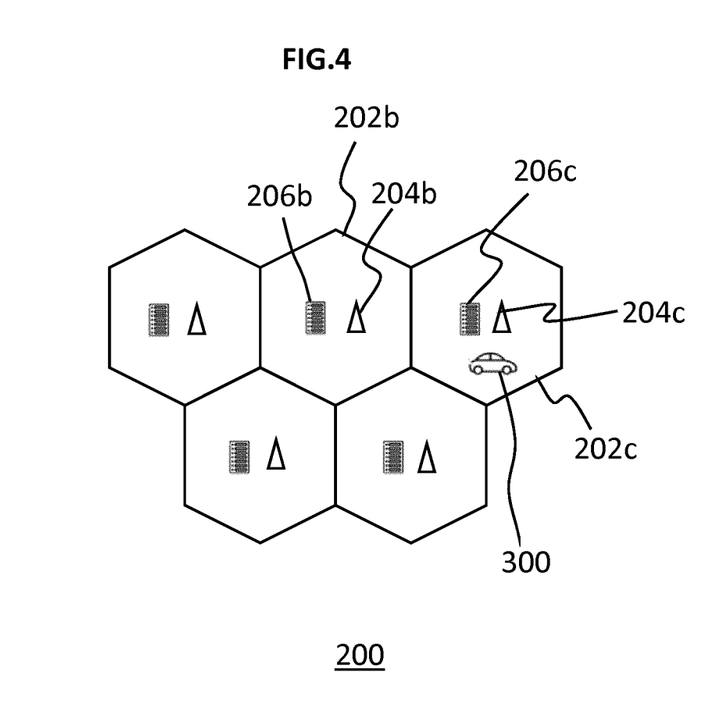
FIG. 4 shows the user equipment in a destination cell of the access network.

FIG. 4 shows the UE 300 after it has left the first cell 202b and entered the second cell 202c. The handover is then performed from the first cell 202b to the second cell 202c. Once the handover is complete, and a new cell becomes the serving cell, second computing information, for example the dynamic information discussed above, can be migrated. This allows the execution to continue on the edge computing resource associated with the new serving base station. When a handover is performed, or has just been performed, the trigger function will cause the initiation of migration of second computing information, typically the dynamic information. The causing of migration of second computing information can be done by sending a second orchestration alert. The migration of dynamic information may be delayed as long as possible in order to ensure that the most up to date data is migrated.

By migrating computing information in the manner discussed above, a smooth handover between the first cell 202b and a destination cell of the UE 300 is enabled as the UE 300 moves between them. This can be done with low latency since the orchestrator was able to prepare for the migration and set up connectivity and compute resources beforehand. By using the position and direction of UEs to predict upcoming handover actions, the network can prepare for them such that the handover procedures are simplified and latency is reduced. By using information available at the base station, for example beamforming as described above, the system does not rely on sensors at the UEs nor additional communication with the UE for the purpose of positioning. This enables the system to support such functionality on low end devices. In embodiments where positioning information from the 5G Massive MIMO radio is used, three-dimensional location of UEs is enabled which provides more accurate movement tracking and prediction.

As discussed above, in some cases, more than one cell is identified for a possible handover. As such, resources may be allocated at a plurality of cells 202 rather than at a single cell. For example, cells adjacent to that which has been predicted may also have the necessary resources allocated in case the UE 300 travels into one of the adjacent cells rather than into the predicted cell. In the example of FIGS. 3 and 4, resources may also be allocated for a third cell 202e, as indicated by the dotted shading, for example at the computing resource 206e of the third cell 202e. This ensures that resources are allocated at the correct cell 202 in the access network 200 in the case that a trajectory of the UE 300 changes over time. In some embodiments, resources may be allocated along a chain of cells. This allows a number of cells along a trajectory of the UE 300 to be prepared in due time for a migration. In some embodiments, the trajectory may be determined periodically, such that the prediction of which cell 202 will be entered is updated in real time.

In the example of FIGS. 3 and 4, the first computing information may therefore be migrated to the computing resource 206e of the third cell 202e, which has also had the necessary resources allocated. In cases where computing information is migrated to a plurality of cells, it is ensured that the eventual destination cell is prepared in the case that a trajectory of the UE 300 changes over time and the UE 300 does not enter the initially predicted target cell. In some cases, the UE 300 may turn and enter the third cell 202e after the trigger function has caused the migration of first computing information to the second cell 204c. In this situation the trigger function might have to cause allocation of resources and a new migration of the first computing data. The UE 300 could of course in some cases turn again, and aim for the second cell 204c again, or possibly a fourth cell. A balance between seamlessness and unnecessary migration is therefore required. While it is necessary to make migration of the first computing information early, in order to guarantee that the first computing information is available, and to some extent up and running in the new edge computing device before the handover, it is beneficial not to make it too early in order to avoid unnecessary migrations.

One also has to consider two other operational cases. In first case, the application in the UE is active and communicates with a server application executing in an edge computing device that also is active. In a second case, the application in the UE and/or the server application are not active, meaning they have not been started or are paused or terminated.

In the first case, when performing a migration, the edge computing device running the server application will continue doing so until another edge computing device takes over. This will typically be done in two steps. Firstly, the first computing information can be migrated to the second edge computing device while the first edge computing device still executes the server application. This means that parts, for example the executable code and more static data, can be migrated, and execution can be prepared and may be partly started in advance of the handover. Secondly, when the handover takes place, the migration of the second computing information can take place. Here, the execution on the first edge computing device will be halted, the dynamic data will be copied and migrated (migration of the second computing information) to the second edge computing device, and then the execution of the server application can continue on the second edge computing device.

In the second case, the migration could be done anyway in order to keep the server application available as close as possible to the UE to provide for a fast start up of the applications if and when they are needed. In this case it might be sufficient with only one migration of computing data, since no parameters or state machines are active. In this case the executable code, the more static data and the dynamic data could be transferred in a single/first migration of computing data. One could of course also imagine a migration of computing data in two steps as discussed above.

Figure 5:
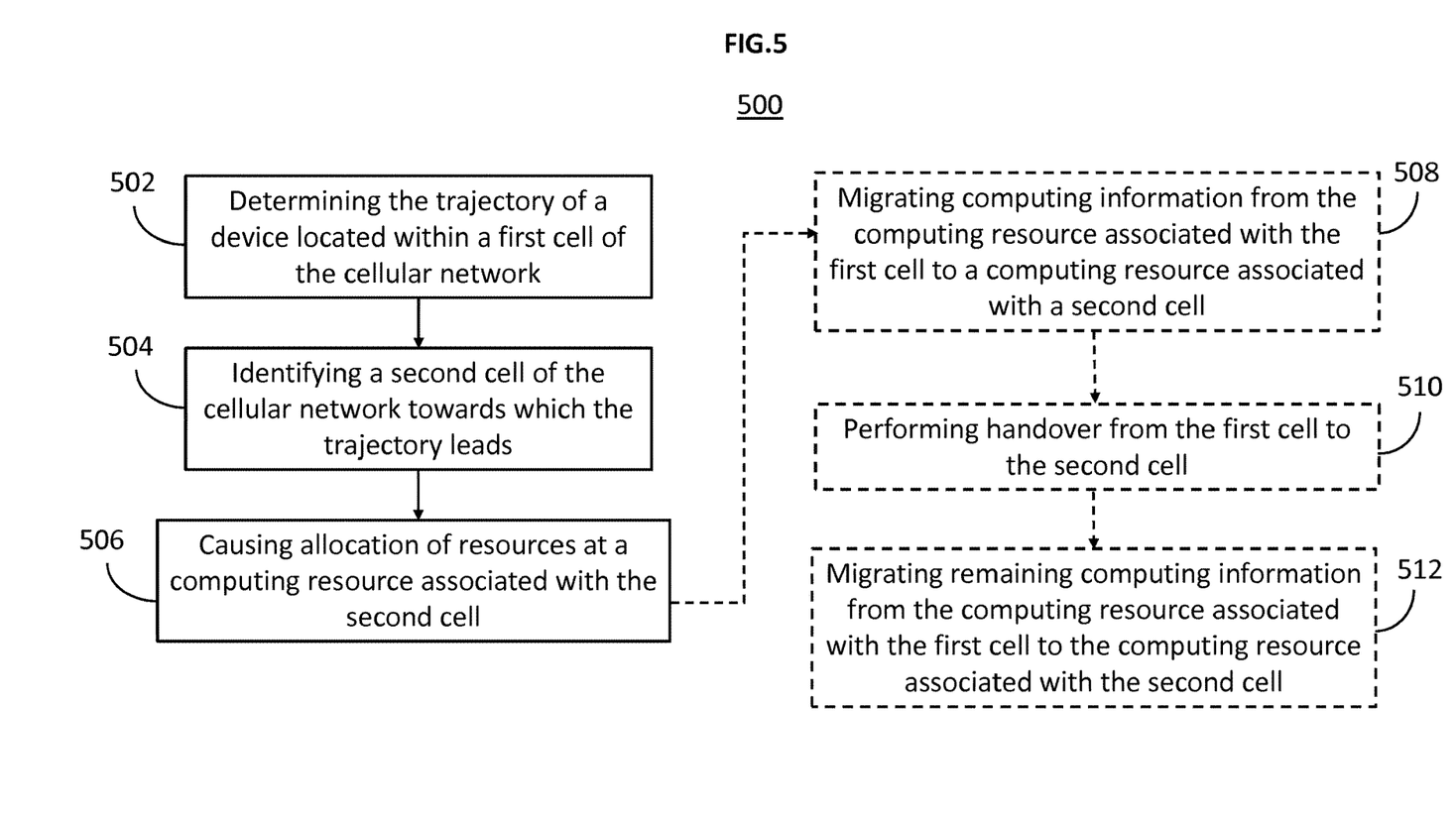
FIG. 5 is a flowchart of a method for enabling migration of computing information between computing devices associated with cells in the access network.

FIG. 5 shows a method 500 for enabling migration of computing information between edge computing devices associated with cells 202 in the access network 200, as shown in FIGS. 2 to 4. The method may be performed at one or more computing devices in the communications system 100. The computing device may be the computing device 206b, another edge computing device 206 in the access network 200, or a computing device located elsewhere in the communication system 100. For example, the computing device may be comprised in a base station 204 in the access network 200 or may be a dedicated edge computing device 206 present somewhere within in another cell 202 of the access network 200. Alternatively, the computing device may be located in another part of the edge network 106, or in the fog 104 or the cloud 102. As discussed above, in some embodiments the trigger function and the orchestrator could be implemented in the same device, whereas in other embodiments they could be implemented in different devices.

At step 502, the trajectory of a UE 300 located within a first cell 202b of the access network 200 is determined. This may be performed by a trigger function, as discussed above. In some embodiments, the trajectory is determined based on determining a beam/signal strength of the UE 300 relative to at least one base station 204 of the access network 200. In some embodiments, the trajectory of the UE 300 is determined based on positioning information from a massive multiple-input and multiple-output (MIMO) antenna, as also discussed above. In some embodiments, the trajectory may be determined using geolocation techniques known in the art, for example the Global Positioning System (GPS).

At step 504, a cell of the access network 200 towards which the determined trajectory leads is identified. In the example of FIG. 3, this is the second cell 202c. This provides a prediction of which cell 202 the UE 300 is travelling into, so that the cell in question can be prepared for a handover when the UE 300 enters the cell. In some embodiments, the trajectory may be determined periodically, such that the identification of the cell 202 that will be entered is updated in real time. This allows the correct cell 202 in the access network 200 to be prepared for the handover in the case that a trajectory of the UE 300 changes over time.

At step 506, the identified cell is prepared for a handover to occur when the UE 300 enters the cell. Specifically, one or more edge computing devices associated with the identified cell has resources allocated to enable migration of computing information from an edge computing device associated with the first cell. As discussed above, this may be performed by an orchestrator that receives a first orchestration alert from the trigger function. The edge computing devices may be respective edge computing devices 206 associated with the cells, as discussed above. Optionally, allocating resources comprises configuring at least one of compute capacity, storage capacity, connectivity, and/or radio capacity of the computing resource associated with the identified cell. As discussed above, the allocation of resources may be performed at other cells 202 of the access network 200 in addition to the predicted target cell. For example, cells adjacent to that which has been predicted may also have the necessary resources allocated in order to prepare for the case the UE 300 travels into one of the adjacent cells rather than into the predicted cell. In some cases the allocation of resources is done as a separate step before the migration of the computing information. While in some other cases the migration of the computing information can be said to comprise the allocation of resources so as to make the allocation of resources and the migration of computing information in a single step.

At step 508, computing information is migrated from edge computing device associated with the first cell (the currently serving base station) to the edge computing device associated with the second cell (the target base station). This may be performed by the orchestrator. The computing information can include static information such as application software, which may be migrated first, as well as dynamic information such as state machines and application variables, which may be migrated at the same time or later. In some embodiments, only the static computing information is migrated at this stage. Migration can be done with low latency since the orchestrator was able to prepare for the migration and set up connectivity and compute resources beforehand. For a limited time, execution of the application may continue on the first edge computing device.

The method comprises, at step 510, performing a handover from the edge computing device associated with the first cell to the edge computing device associated with the second cell. The target base station is now the new serving base station. In the example of FIG. 3, this is to the edge computing device 206c associated with the second cell 202c. In cases where a plurality of cells have had the necessary resources allocated. The migration may comprise migrating computing information to an edge computing device associated with at least one of the relevant cells. In the example of FIG. 3, the computing information is migrated from the edge computing device 206b of the first cell 202b to the edge computing device 206c of the second cell 202c and the edge computing device 206e of the neighbouring cell 202e.

In embodiments where only the static information is migrated at step 508, the method may comprise a further step 512 of migrating any remaining computing information, for example the dynamic information discussed above, allowing the execution to continue on the edge computing resource associated with the target base station.

The method 500 allows for improved orchestration of edge cloud applications by using the position and direction of UEs to predict upcoming migration actions, and preparing computing resources accordingly such that the handover procedures are simplified and latency is reduced. By using information available at the base station, the system does not rely on sensors at the UEs nor additional communication with the UE for the purpose of positioning. This enables the system to support such functionality on low end devices. In embodiments where positioning information from the 5G massive MIMO radio is used, three-dimensional location of UEs is enabled which provides more accurate movement tracking and prediction.

Figure 6:
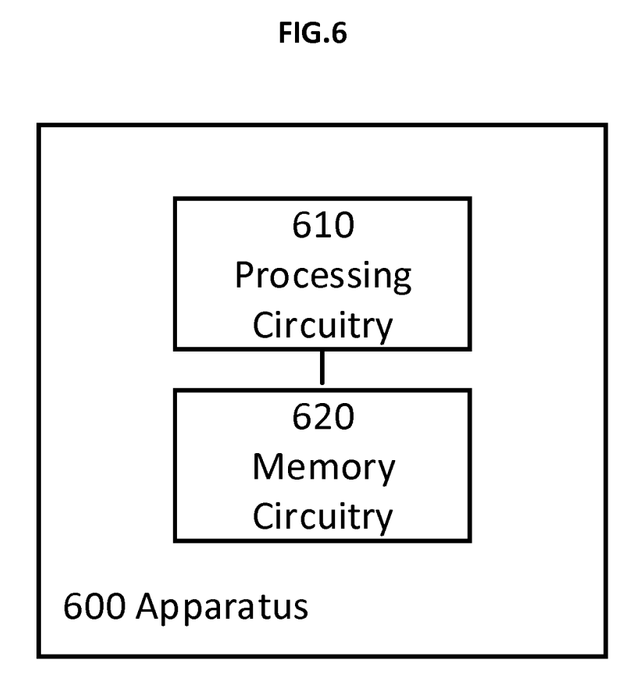
FIG. 6 shows an example implementation of an apparatus.

FIG. 6 discloses an example implementation of an apparatus 600, which may be configured to perform the above-mentioned method. As discussed above, this may be one of the computing devices in the communications system 100, for example a computing resource 206 in the access network 200, or a computing device located elsewhere in the communication system 100.

The apparatus 600 may comprise a processor, or a processing circuitry 610, and a memory, or a memory circuitry 620. The memory circuitry 620 may store computer program code which, when run in the processing circuitry 610, may cause the apparatus 600 to perform the method 500. In one exemplary embodiment, the computer program code, when run in the processing circuitry 610, may cause the apparatus 600 to determine the trajectory of a wireless communication device located within a first cell of the cellular network. The apparatus 600 may then be caused to identify at least one second cell of the cellular network towards which the trajectory leads. Thereafter, the apparatus 600 is caused to cause allocation of resources at one or more edge computing devices associated with the at least one second cell to enable migration of computing information from an edge computing device associated with the first cell to the one or more edge computing devices associated with the at least one second cell.

In some embodiments, the memory circuitry 620 may store computer program code which, when run in the processing circuitry 610, may cause the apparatus 600 to determine the trajectory of the wireless communication device based on a beam/signal strength of the wireless communication device relative to at least one access node of the network. In some embodiments, the memory circuitry 620 may store computer program code which, when run in the processing circuitry 610, may cause the apparatus 600 to determine the trajectory of the wireless communication device based on positioning information from a massive MIMO antenna.

In some embodiments, the memory circuitry 620 may store computer program code which, when run in the processing circuitry 610, may cause the apparatus 600 to cause allocation of resources comprising configuring at least one of compute capacity, storage capacity, connectivity, and/or radio capacity of the edge computing device associated with the at least one second cell. In some embodiments, the memory circuitry 620 may store computer program code which, when run in the processing circuitry 610, may cause the apparatus 600 to complete the allocation of resources before the wireless communication device leaves the first cell.

In some embodiments, the memory circuitry 620 may store computer program code which, when run in the processing circuitry 610, may cause the apparatus 600 to migrate computing information from the edge computing device associated with the first cell to an edge computing device associated with a destination cell of the at least one second cells. In some embodiments, the memory circuitry 620 may store computer program code which, when run in the processing circuitry 610, may cause the apparatus 600 to migrate computing information from an edge computing device of the first cell to an edge computing device of the destination cell.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method, performed by a computing device in a communication system, for enabling migration of computing information between a first edge computing device associated with a first cell in a cellular network and at least a second edge computing device associated with a second cell in the cellular network, wherein the cellular network comprises a plurality of cells, the method comprising:
   determining a trajectory of a wireless communication device located within a first cell of a cellular network based on positioning information received from a massive Multiple-Input and Multiple-Output (MIMO) antenna operatively connected to a base station in an access network;
   identifying a second cell of the cellular network towards which the trajectory leads;
   causing allocation of resources at the second edge computing device associated with the second cell to enable migration of computing information from the first edge computing device associated with the first cell to the second edge computing device associated with the second cell, wherein the computing information enables the wireless communication device to operate with an application executing on the second edge computing device;
   before handover is performed, migrating a first group of computing information from the first edge computing device associated with the first cell to the second edge computing device associated with the second cell, wherein the first group of computing information comprises static information; and
   when the handover has been performed, migrating a second group of computing information from the first edge computing device associated with the first cell to the second edge computing device associated with the second cell, wherein the second group of computing information comprises dynamic information; and
   wherein the dynamic information comprises information that changes frequently relative to the static information.

2. The method of claim 1, wherein the method comprises determining the trajectory of the wireless communication device based on determining a beam/signal strength of the wireless communication device relative to at least one access node of the network.

3. The method of claim 1, further comprising causing allocation of resources at at least one third edge computing device associated with at least one third cell to enable migration of computing information from the first edge computing device associated with the first cell to the at least one third edge computing device associated with the at least one third cell.

4. The method of claim 1, wherein the allocation of resources comprises configuring computational capacity, storage capacity, connectivity, and/or radio capacity of the respective edge computing device.

5. A computing device in a communications system for enabling migration of computing information between a first edge computing device associated with a first cell in a cellular network and at least a second edge computing device associated with a second cell in the cellular network, wherein the cellular network comprises a plurality of cells, the computing device comprising:
  processing circuitry; and
  memory containing instructions executable by the processing circuitry whereby the computing device is operative to:
    determine a trajectory of a wireless communication device located within a first cell of a cellular network based on positioning information received from a massive Multiple-Input and Multiple-Output (MIMO) antenna operatively connected to a base station in an access network;
    identify a second cell of the cellular network towards which the trajectory leads;
    cause allocation of resources at the second edge computing device associated with the second cell to enable migration of computing information from the first edge computing device associated with the first cell to the second edge computing device associated with the second cell, wherein the computing information enables the wireless communication device to operate with an application executing on the second edge computing device;
    before handover is performed, migrating a first group of computing information from the first edge computing device associated with the first cell to the second edge computing device associated with the second cell, wherein the first group of computing information comprises static information;
    when the handover has been performed, migrating a second group of computing information from the first edge computing device associated with the first cell to the second edge computing device associated with the second cell, wherein the second group of computing information comprises dynamic information; and
    wherein the dynamic information comprises information that changes frequently relative to the static information.

6. The computing device of claim 5, wherein the instructions are such that the computing device is operative to determine the trajectory of the wireless communication device based on a beam/signal strength of the wireless communication device relative to at least one access node of the network.

7. The computing device of claim 5, wherein the instructions are such that the computing device is operative to cause allocation of resources at at least one third edge computing device associated with at least one third cell to enable migration of computing information from the first edge computing device associated with the first cell to at least one third edge computing device associated with at least one third cell.

8. The computing device of claim 5, wherein the allocation of resources comprises configuring computational capacity, storage capacity, connectivity, and/or radio capacity of the respective edge computing device.

9. A non-transitory computer readable recording medium storing a computer program product for controlling a computing device in a communications system for enabling migration of computing information between a first edge computing device associated with a first cell in a cellular network and at least a second edge computing device associated with a second cell in the cellular network, wherein the cellular network comprises a plurality of cells, the computer program product comprising program instructions which, when run on processing circuitry of the computing device, causes the computing device to:
  determine a trajectory of a wireless communication device located within a first cell of a cellular network based on positioning information received from a massive Multiple-Input and Multiple-Output (MIMO) antenna operatively connected to a base station in an access network;
  identify a second cell of the cellular network towards which the trajectory leads;
  cause allocation of resources at the second edge computing device associated with the second cell to enable migration of computing information from the first edge computing device associated with the first cell to the second edge computing device associated with the second cell, wherein the computing information enables the wireless communication device to operate with an application executing on the second edge computing device;
  before handover is performed, migrating a first group of computing information from the first edge computing device associated with the first cell to the second edge computing device associated with the second cell, wherein the first group of computing information comprises static information; and
  when the handover has been performed, migrating a second group of computing information from the first edge computing device associated with the first cell to the second edge computing device associated with the second cell, wherein the second group of computing information comprises dynamic information; and
  wherein the dynamic information comprises information that changes frequently relative to the static information.

10. The method of claim 1, wherein the static information comprises one or more of:
  executable code;
  application software; and
  static data.

11. The method of claim 1, wherein the dynamic information comprises one or more of:
  a state machine; and
  an application variable.

* * * * *